United States Patent [19]

Resconi et al.

[11] Patent Number: 5,126,303
[45] Date of Patent: Jun. 30, 1992

[54] CATALYSTS FOR THE POLYMERIZATION OF OLEFINS

[75] Inventors: Luigi Resconi; Umberto Giannini, both of Milan; Enrico Albizzati, Novara, all of Italy

[73] Assignee: Hinmont Incorporated, Wilmington, Del.

[21] Appl. No.: 471,902

[22] Filed: Jan. 29, 1990

[30] Foreign Application Priority Data

Jan. 31, 1989 [IT] Italy ................... 19253 A/89

[51] Int. Cl.$^5$ .................................................. C08F 4/642
[52] U.S. Cl. .................................... 502/117; 502/103; 502/109; 502/120; 502/132; 526/127; 526/160
[58] Field of Search ............... 502/103, 109, 117, 120, 502/132

[56] References Cited

U.S. PATENT DOCUMENTS

| | | | |
|---|---|---|---|
| 4,752,597 | 6/1988 | Turner | 502/104 |
| 4,769,510 | 9/1988 | Kaminsky et al. | 585/512 |
| 4,871,705 | 10/1989 | Hoel | 502/117 |
| 4,892,851 | 1/1990 | Enen et al. | 502/103 X |
| 4,931,417 | 6/1990 | Miya et al. | 502/117 |
| 4,931,517 | 6/1990 | Fujita | 502/117 X |
| 4,937,301 | 6/1990 | Chang | 502/117 X |
| 4,952,540 | 8/1990 | Kioka et al. | 502/103 X |

FOREIGN PATENT DOCUMENTS

| | | |
|---|---|---|
| 0137097 | 4/1985 | European Pat. Off. . |
| 0185918 | 7/1986 | European Pat. Off. ............ 502/117 |
| 0295312 | 12/1988 | European Pat. Off. . |

OTHER PUBLICATIONS

C.A., vol. 106 (1987), 13888j.
"HP 5921A Atomic Emission Detector".
"GC-AED Brochure Analysis" Michael Free and Lindy Miller.
"HP5921A Atomic Emission Detector," press release circa Jan. 9, 1989.
"HP Introduces First Benchtop Atomic-Emission Detector" press release circa Jan. 9, 1989.
Abstract (only) of Japanese Patent 60-245605.
Kaminsky, W. et al. "Bis(cyclopentadienyl)zirkon-Verbindungen und Aluminoxan als Ziegler-Katalysatoren fur die Polymerisation und Copolymerization von Olefinen" Makromol. Chem., Rapid Commun. 4, 417–421 (1983).

*Primary Examiner*—Patrick P. Garvin

[57] ABSTRACT

Catalysts for the polymerization of olefins, comprising the product of the reaction between:
A) a cyclopentadienyl compound of Ti, Zr or Hf;
B) an alumoxane compound of formula:

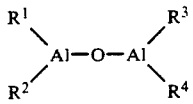

in which $R^1$, $R^2$, $R^3$, $R^4$, the same or different from each other, are alkyl, alkenyl or alkylaryl radicals having 2 to 20 carbon atoms.

13 Claims, No Drawings

CATALYSTS FOR THE POLYMERIZATION OF OLEFINS

The present invention relates to catalysts for the polymerization of olefins, obtained from metallocene compounds and alumoxane compounds.

Polymerization of olefins and vinylaromatic monomers with the use of a mixture of (A) a metallocene and (B) an alkylalumoxane as catalyst is known.

Components A) can be referred to the following general formulas:

$$(C_5R'_n)_m R''_p (C_5R'_n) MX_{3-m} \text{ or}$$

$$R''_p (C_5R'_n)_2 MX'$$

in which $(C_5R'_n)$ is a cyclopentadienyl group or a substituted cyclopentadienyl group, wherein radicals R', are the same or different, and are hydrogen or an alkyl, alkenyl, aryl, alkylaryl or arylalkyl radical containing 1 to 20 carbon atoms, or two or four R' substituents forming one or two rings having 4 to 6 carbon atoms; R'' is an alkylene group containing 1 to 4 carbon atoms, or

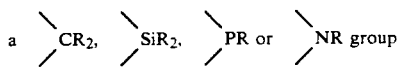

connecting by bridge the two $C_5R'_n$ rings where R is defined as R';

X is a hydrocarbon radical defined as R', an atom of halogen, hydrogen, or an alkoxyl group, and the X radicals may be the same or different; X' is an alkylidene radical which has 1 to 20 carbon atoms; M is a transition metal selected from the group consisting of Ti, Zr and Hf; p is 0 or 1; m is a number selected from 0,1 and 2; when m=0, p is=0; n=4 when p=1, n=5 when p=0.

The alkylalumoxane compounds have the formula

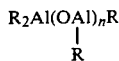

in which n is a number from 1 to 20, and R is an alkyl radical having 1 to 15 carbon atoms, or the formula:

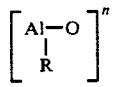

in which n is from 2 to 20.

The catalytic system mentioned above are described in the following patents:
U.S. Pat. No. 4,404,344
U.S. Pat. No. 4,542,199
EPA 185,918
EPA 226,463
U.S. Pat. No. 4,752,597
EPA 128,045
EPA 128,046
EPA 260,130
EPA 260,999
EPA 129,368
U.S. Pat. No. 4,530,914
U.S. Pat. No. 4,522,982.

As alumoxane, compounds are used in which n is always greater than 2 and R is always methyl. In particular, methylalumoxanes with an average molecular weight of over 500 are used, in which n has the value of 6–7.

The preparation of methylalumoxanes, reported for example in U.S. Pat. No. 4,544,762, EPA 257,695, and EPA 208,561, is very burdensome from an economic standpoint and is poorly reproducible.

Moreover, the preparation is quite dangerous because of the high inflammability of trimethylaluminium and its violent reaction with water.

The quantity of methylalumoxane to be used should be very high, especially in the case of the polymerization of propylene, namely at least 1 g of compound per liter of polymerization solvent (EPA 185,918).

The disadvantage listed above make it difficult to use methylalumoxanes industrially. The polymerization of ethylene with a catalyst obtained from $(C_2H_5)_2Zr(CH_3)_2$ and $(iC_4H_9)_4Al_2O$ is described in Makromol. Chem. Rapid Communication (1983) 4, 417.

However, the activity of this system is not high, and it is considerably less than what is obtainable with the use of polymethylalumoxane instead of tetraisobutylalumoxane.

It is to be noted that the yield reported in the above cited publication is incorrectly expressed in g polymer/g Zr, whereas in reality it should be referred to the gram atoms of Zr. The value reported is actually 91.2 times lower.

Finally, the polymerization of propylene and similar alpha olefins with stereospecific catalytic systems obtained from methylalumoxane compounds and stereorigid and "chiral" zirconium compounds such as ethylene-bis-indenyl-zirconium dichloride and ethylene-bis(4,5,6,7,-tetrahydroindenyl) zirconium dichloride is known (U.S. Pat. No. 4,769,510).

The alkylalumoxane compounds used have the formula: $Al_2OR_4(Al(R)-O)_n$ or $(Al(R)-O)_{n+2}$, in which n is an integer number from 4 to 20 and R is methyl or ethyl.

Catalytic systems have now unexpectedly been found possessing an elevated activity in the polymerization of ethylene and alpha-olefines $CH_2=CHR$, in which R is an alkyl radical with 1–8 carbon atoms, or their mixtures optionally containing lesser proportions of a diolefin prepared from metallocene compounds and alumoxane compounds of general formula:

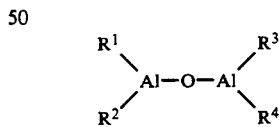

where $R^1$, $R^2$, $R^3$, $R^4$ are the same or different and are alkyl, alkenyl or alkylaryl radicals having 2 to 20 carbon atoms.

Cyclopentadienyl compounds of the following formula are used as metallocene compounds:

$$(C_5R'_n)_m R''_p (C_5R'_n) MX_{3-m} \qquad (I)$$

which $(C_5R'_n)$ is a cyclopentadienyl group with R' substituents, which are the same or different from each other and are hydrogen, an alkyl, alkenyl, aryl, alkylaryl or arylalkyl radical containing 1 to 20 carbon atoms, or a

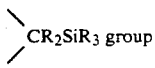

or a-SiR$_3$ group in which R has the meaning of R', or where two or four R' substituents form one or two rings having 4 to 6 carbon atoms; R'' is an optionally substituted alkylene group containing 1 to 8 carbon atoms or a

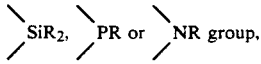

where R is defined as R'; X is the same or different from each other and is hydrogen, an R' hydrocarbon, a halogen atom, an alkoxyl group OR', a hydroxyl or an OMX(C$_5$R'$_n$)$_2$ group; M is a transition metal having valence state of 3 or 4, selected from Ti, Zr and Hf; p may be 0 or 1; m may be 0,1 or 2; when m=0, p=0, and when p=0, at least one R' is different from hydrogen; n=4 when p=1, and n=5 when p=0.

Formula I) particularly includes compound of formula II)

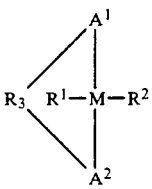

in which A$^1$ and A$^2$, are the same or different and are mononuclear or polynuclear asymmetric radicals, in particular, they are indenyl radicals; R$_3$ is a straight-chain hydrocarbon radical with 1–4 carbon atoms or a cyclic radical with 3–6 carbon atoms; the R$^1$ and R$^2$ radicals are the same or different and are halogen atoms or alkyl radicals with 1–6 carbon atoms; M is a transition metal selected from Ti, Zr and Hf.

The alumoxane compounds used in the catalysts of the invention are prepared for example, according to the method reported in JACS 90:3173, 1968 from the corresponding trialkyl aluminium and water vapor in 2:1 molar ratio. It is necessary to separate and purify the reaction products. The yields are quantitative.

Preferred compounds of formulas I and II are those in which at least two of the R' radicals are other than hydrogen.

Non limiting examples of cyclopentadienyl compounds of formula I include:
[C$_5$(CH$_3$)H$_4$]$_2$MCl$_2$, [C$_5$(CH$_3$)H$_4$]$_2$M(CH$_3$)$_2$, [C$_5$(CH$_3$)H$_4$]$_2$MH$_2$,
[C$_5$(CH$_3$)H$_4$]$_2$M(OCH$_3$)$_2$, {[C$_5$(CH$_3$)H$_4$]$_2$M}$_2$O,
[C$_5$(CH$_3$)H$_4$]$_2$M(H)Cl, [C$_5$(CH$_3$)H$_4$]$_2$M[CH$_2$C(CH$_3$)$_3$]$_2$,
[C$_5$(CH$_3$)H$_4$]$_2$M(CH$_2$C$_6$H$_5$)$_2$,
[C$_5$(CH$_3$)H$_4$]$_2$M[CH$_2$Si(CH$_3$)$_3$]$_2$,
[C$_5$(CH$_3$)$_2$H$_3$]$_2$MCl$_2$, [C$_5$(CH$_3$)$_3$H$_2$]$_2$MCl$_2$,
[C$_5$(CH$_3$)$_4$H]$_2$MCl$_2$,
[C$_5$(CH$_3$)$_5$]$_2$MCl$_2$, [C$_5$(CH$_3$)$_5$]$_2$MCl,
[C$_5$(CH$_3$)$_5$]$_2$M(CH$_3$)$_2$,
[C$_5$(CH$_3$)$_5$]$_2$MH$_2$, [C$_5$(CH$_3$)$_5$]$_2$M(OCH$_3$)$_2$,
[C$_5$(CH$_3$)$_5$]$_2$M(OH)Cl,
[C$_5$(CH$_3$)$_5$]$_2$M(OH)$_2$, {C$_5$[Si(CH$_3$)$_3$]H$_4$}$_2$MCl$_2$,
{C$_5$[Si(CH$_3$)$_3$]$_2$H$_3$}$_2$MCl$_2$ wherein M is selected from Ti, Zr, Hf; it is preferably Zr.

Examples of compounds included in formula II) which were found to be especially suitable include:
ethylene-bis(indenyl)ZrCl$_2$ raceme,
ethylene-bis(indenyl)Zr(CH$_3$)$_2$ raceme,
ethylene-bis(4,5,6,7-tetrahydroindenyl)zirconium dichloride raceme,
dimethylsilyl-bis(indenyl)zirconium dichloride raceme,
ethylene-bis(indenyl)Zr(CH$_3$)Cl raceme,
ethylene-bis(indenyl)Zr(OCH$_3$)$_2$ raceme,
ethylene-bis(indenyl)Zr(OCH$_3$)Cl raceme,
ethylene-bis(indenyl)ZrH$_2$ raceme.

The preferred compounds of formula I) are those in which at least two, and preferably all R' radicals are other than hydrogen.

Examples of these compounds are
[C$_5$(CH$_3$)$_5$]$_2$MCl$_2$, [C$_5$(CH$_3$)$_5$]$_2$M(CH$_3$)$_2$, [C$_5$(CH$_3$)$_5$]$_2$MH$_2$.

Examples of alumoxanes are
(C$_2$H$_5$)$_2$Al-O-Al(C$_2$H$_5$)$_2$; (iC$_4$H$_9$)$_2$Al-O-Al (iC$_4$H$_9$)$_2$;
(C$_6$H$_5$CH$_2$)$_2$Al-O-Al(CH$_2$C$_6$H$_5$)$_2$; (iC$_6$H$_{13}$)$_2$Al-O-Al (iC$_6$H$_{13}$)$_2$.

The catalysts of the invention are suitable for the polymerization of ethylene and/or alpha-olefins CH$_2$=CHR, in which R is an alkyl radical with 1–8 carbon atoms or mixtures of ethylene with said alpha-olefins containing lesser proportions of ethylene. The process is carried out in liquid phase, in the presence or absence of a hydrocarbon solvent, or in gas phase and in a broad temperature and pressure range. Hydrocarbon solvents which may be used include aliphatic hydrocarbons, such as hexane and heptane, and aromatic compounds, such as benzene and toluene, or chlorinated compounds, such as dichloroethane or methylene chloride. It is possible to regulate the molecular weight of the polymers by simply varying the polymerization temperature, the type or concentration of the metallocene and alumoxane compound, or by using molecular weight regulators such as hydrogen, for example.

The cyclopentadienyl compounds of formula II form a catalyst possessing elevated stereospecificity in the polymerization of the alpha-olefins CH$_2$=CHR, especially propylene and its mixtures with lesser portions of ethylene and/or a CH$_2$=CHR olefin. Polymers of propylene with elevated index of isotacticity possessing valuable mechanical properties are obtained.

In a further embodiment of the present invention, the stereospecific catalysts obtained from compounds of formula II) are especially suitable for the preparation of copolymers of ethylene with lesser proportions of CH$_2$=CHR olefins containing up to 15% in moles of alpha-olefins. Said copolymers are characterized by an elevated ratio between moles of alpha-olefin copolymerized and the density of the copolymer, which is indicative of a regular distribution of the alpha-olefin in the polymer chain and of composition homogeneity.

By using the above mentioned stereospecific catalysts, it is possible to obtain elastomeric copolymers of ethylene with proportions of propylene and/or another CH$_2$=CHR alpha-olefin between 20 and 70% by moles and optionally containing lesser proportions of a diene, which are amorphous or substantially amorphous polymers possessing valuable mechanical properties.

The catalyst of the invention can be supported on inert supports, such as oxides like silica or alumina or polymeric supports, such as partially crosslinked styrenedivinylbenzene resins. This is achieved by depositing the metallocene compound or the reaction product of same with the alumoxane, or the alumoxane compound on such a support.

The solid component thus obtained, optionally in combination with another alumoxane component, may advantageously be used in polymerization in the gas phase.

One of the advantages offered by the catalysts of the present invention in comparison with those of the known art is the easy preparation of the alumoxane compound, which is done by starting from a less dangerous alkyl aluminun compound in comparison with the trimethylaluminum used in the catalysts known to date. Moreover, the yield in alumoxane compound is quantitative, and therefore it is not necessary to purify the compound obtained.

The alumoxane component used in the catalysts of the invention moreover provides, in combination with the metallocene compound, catalysts possessing a high activity even if used at low concentrations, for example 1-10 mmoles/l solvent.

Especially interesting results are obtained when the components of the catalyst are contacted before polymerization for periods from 1 to 60 minutes, preferably 5 to 60 minutes, at concentrations of the metallocene compound between $10^{-3}$ and $10^{-8}$ moles/l solvent and between 1 and 10 moles/l for the alumoxane compound.

The contact may be carried out in the presence of small quantities of monomer.

The following examples illustrate but do not limit the invention.

EXAMPLE 1

Synthesis of alumoxane compound B1

Sixty ml toluene and 5.4 ml triethylaluminum were introduced into a 250 ml three-neck flask equipped with magnetic stirrer, in a nitrogen atmosphere, the solution was cooled to 0° C.

0.355 ml distilled and deareated water was introduced into a vessel connected to the reaction flask.

By means of a membrane compressor, the gas within the system was circulated in the reaction flask until complete consumption of the water and then for another 10 minutes at room temperature. The clear and colorless solution thus obtained was concentrated to 30 ml by evaporation of the solvent at reduced pressure; the volume was then made up to 50 ml with toluene. A 0.79M solution in aluminum was obtained. This solution was used as such in polymerization (component B1).

EXAMPLE 2

Synthesis of alumoxane compound B2

The procedure and ingredients of Example 1 was used, except that 10 ml triisobutyl-aluminum was used instead of triethylaluminum.

A 0.79M solution was obtained. This solution was used as such in polymerization (component B2).

EXAMPLE 3

Synthesis of alumoxane compound B3

The procedure and ingredients of Example 1 was used, except that 6.83 ml Al(2-methylpentyl)$_3$ was used instead of triethylaluminum in 60 ml toluene with 0.177 ml water.

The volume was made up to 25 ml with toluene, obtaining a 0.79 M aluminum solution. This solution is used as such in polymerization (component B3).

EXAMPLES 4-9

Polymerization of ethylene

In a 1-liter autoclave, equipped with jacket for heat control, thermocouple, valves for nitrogen and for feeding monomer, manometer, and magnetic drive steel agitator, thermostated at 50° C., after evacuation and filling with nitrogen, a vacuum is created, and finally 1 atm. of ethylene and 350 ml toluene are introduced, the temperature was maintained inside at 50° C.

2.1 ml of the solution of the alumoxane component and 0.1 mg of the metallocene component in 50 ml toluene was added. After 5 minutes of contact at room temperature, the solution was injected into the autoclave, the system was pressurized with ethylene to 4 atm., and polymerization proceeded for 1 hour at 50° C., the ethylene pressure was kept constant.

The results of the examples are presented in Table 1.

COMPARATIVE EXAMPLE 10

The procedure and ingredients of Example 1 was used, except that $(C_5H_5)_2ZrCl_2$ is used as the metallocene compound in combination with component B2.

0.1 g polyethylene was obtained.

EXAMPLE 11

Ethylene-1-butene copolymerization

The procedure and ingredient of Example 4 was used, except that 16 ml 1-butene was also added into the autoclave together with 370 ml toluene, after which the system is thermostated at 50° C. and saturated with 3 atm. ethylene.

5.1 ml of solution B2 and 1 mg ethylene-bis(indenyl) zirconium dichloride were added in 25 ml toluene.

After 5 minutes of contact at room temperature, this solution was injected into the autoclave.

The system was pressurized to 4 atm. with ethylene, and polymerization proceeded at 75° C. for 15 minutes.

41 g the copolymer was obtained, having a density (30° C.)=0.907 g/ml and $(\eta)_{inh}$=1.35 dl/g.

According to $^{13}C$ NMR analysis (ref. J. Polym. Sci., Polym. Ph. 11:275, 1973) the 1-butene copolymerized is equal to 4.3% in moles.

EXAMPLE 12

Ethylene-propylene copolymerization

The procedure and ingredients of Example 5 was used, except that an ethylene-propylene mixture in 2:1 ratio by volume was used instead of ethylene.

5.1 ml solution B2 and 0.5 mg ethylene-bis(4,5,6,7-tetrahydroindenyl)zirconium dichloride were added in 25 ml toluene.

After 5 minutes of contact at room temperature, the solution was injected into the autoclave.

The system was pressurized to 4 atm. with the ethylenepropylene gas mixture, and polymerization proceeded for 10 minutes at constant pressure at 50° C. with agitation of 1100 rpm.

25 g ethylene-propylene copolymer was obtained, with a propylene content of 40.9% by weight.

EXAMPLE 13

Propylene polymerization

After evacuation and filling the autoclave used in examples 4-9 thermostated at 50° C., a vacuum was created and it is filled with nitrogen; 1.5 atm propylene and 350 ml toluene were then introduced, and the internal temperature is brought to 23° C.

2.5 ml component B2 and 2 mg ethylene-bis(indenyl)-zirconium dichloride were dissolved in 50 ml toluene.

After 5 minutes at room temperature, the solution is loaded into the autoclave, the system was pressurized with propylene to 3.5 atm., and polymerization proceeded for 4 hours at 23° C., and agitation at 1100 rpm.

19.9 g polypropylene was obtained.

$(\eta)_{inh}$ (THN, 135° C.)=0.66
$\overline{Mw}/\overline{Mn}$=2.1
$\overline{Mw}$=74,800
Tm=140.5° C.

According to $^{13}$C NMR analysis the polymer is highly isotactic (triade mm=94.7%).

EXAMPLE 14

The procedure and ingredients of Example 13 was used, except that 5.1 ml of solution B3 was used as the alumoxane component.

23.9 g polypropylene was obtained.

$(\eta)_{inh}$ (THN, 135° C.)=0.60
Tm=141.6° C.

EXAMPLE 15

The procedure and ingredients of Example 13 was used, except that 5.1 ml of solution B2 and 2 mg ethylene-bis(indenyl) zirconium dichloride dissolved in 2 ml of toluene were injected in rapid succession into the autoclave containing 400 ml toluene saturated at 23° C. with propylene at 1.5 atm. The system was pressurized to 4 atm. with propylene, and polymerization proceeded for 4 hours at 23° C.

10.8 g polypropylene was obtained.

$(\eta)_{inh}$ (THN, 135° C.)=0.63
$\overline{Mw}/\overline{Mn}$=3.6
$\overline{Mw}$=95,100
Tm=141.0° C.

COMPARATIVE EXAMPLE 16

The procedure and ingredients of Example 13 was used, except that 116 mg methylalumoxane (2 mmol aluminum) was introduced into the reaction vessel with 400 ml toluene, after which propylene was introduced up to a pressure of 4 atm, operating at 23° C., then 2 mg ethylene-bis(indenyl)zirconium dichloride dissolved in 2 ml toluene was injected. Polymerization proceeded for 4 hours at 23° C. with agitation at 1100 rpm.

Only traces of polymer were obtained.

TABLE 1

| Ex. No. | Component A | Component B' | $g_{PE}/g_{Zr}\cdot h$ | Al, mmols/l |
|---|---|---|---|---|
| 4 | [C$_5$(CH$_3$)H$_4$]$_2$ZrCl$_2$ | B1 | 48,200 | 5 |
| 5 | [C$_5$(CH$_3$)H$_4$]$_2$ZrCl$_2$ | B2 | 131,900 | 5 |
| 6 | [C$_5$(CH$_3$)$_5$]$_2$ZrCl$_2$ | B1 | 748,800 | 5 |
| 7 | [C$_5$(CH$_3$)$_5$]$_2$ZrCl$_2$ | B2 | 971,500 | 4.2 |
| 8 | [C$_5$(CH$_3$)$_5$]$_2$ZrCl$_2$ | B3 | 33,200 | 10 |
| 9 | (indenyl )$_2$TiCl$_2$ | B2 | 16,800 | 5 |
| 10 | (C$_5$H$_5$)$_2$ZrCl$_2$ | B2 | 4,700 | 5 |

We claim:

1. A catalyst for the polymerization of olefins comprising the product of the reaction between:
A) a metallocene compound having the formula:

$$(C_5R'_n)_m R''_p (C_5R'_n) MX_{3-m}$$

wherein ($C_5R'_n$) is a cyclopentadienyl group in which the R' radicals are the same or different from each other and are hydrogen, alkyl, alkenyl, aryl, alkylaryl or arylalkyl radical having 1 to 20 carbon atoms, or a —CR$_2$SiR$_3$ group or a -SiR$_3$ group with R having the meaning of R', or where two or four R' substituents form one or two rings having 4 to 6 carbon atoms; R'' is an alkylene radical containing 1 to 8 carbon atoms, or

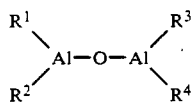

a $\diagdown$SiR$_2$, $\diagdown$PR or $\diagdown$NR group in which R has the meaning of R'; X is the same or different from each other and is hydrogen, a hydrocarbon radical R', a halogen atom, an alkoxy group OR', a hydroxy, or an OMX(C$_5$R'$_n$)$_2$ group; M is transition metal in valence state of 3 or 4 selected from Ti, Zr and Hf; p is 0 or 1; m is 0,1 or 2; when m=0, p is=0, and when p =0 at least one R' radical is different from hydrogen; n=4 when p=1, and n=5 when p=0.

B) an alumoxane compound of formula:

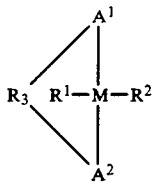

wherein R$^1$, R$^2$, R$^3$, R$^4$, are the same or different from each other and are alkyl, alkenyl or alkylaryl radicals having 2 to 20 carbon atoms.

2. The catalyst of claim 1, in which the metallocene compound contains at least two R' radicals other than hydrogen.

3. The catalyst of claim 2, in which all R' radicals are other than hydrogen.

4. The catalyst of claim 1, in which the metallocene compounds have the formula:

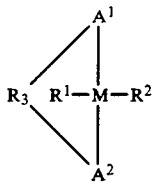

in which A$^1$ and A$^2$ are the same or different and are mononuclear or polynuclear asymmetric radicals, R$^3$ is a straight hydrocarbon radical with 1-4 carbon atoms or a cyclic radical with 3-6 carbon atoms; R$^1$ and R$^2$ radicals are the same or different and are halogen atoms or alkyl radicals with 1-6 carbon atoms; M is a transition metal selected from Ti, Zr and Hf.

5. The catalyst of claim 4, in which A$^1$ and A$^2$ are indenyl or hydrogenated indenyl radicals, R$^3$ is an ethylene radical, R$^1$and R$^2$ are halogen atoms, and M is Zr.

6. The catalyst of claim 1, in which A) is a compound selected from the group consisting of [C$_5$(CH$_3$)$_5$]MCl$_2$, [C$_5$(CH$_3$)$_5$]$_2$M(CH$_3$)$_2$, [C$_5$(CH$_3$)$_5$]$_2$MH$_2$, ethylene-bis- (indenyl)ZrCl$_2$ raceme, ethylene-bis(indenyl)Zr(CH$_3$)$_2$ raceme, ethylene-bis(4,5,6,7-tetrahydroindenyl)zirconium dichloride raceme, dimethyl silyl-bis(indenyl)-zirconium dichloride raceme, ethylene-bis(indenyl)Zr(CH$_3$)Cl raceme, ethylene-bis(indenyl)Zr(OCH$_3$)$_2$ raceme, ethylene-bis(indenyl)Zr(OCH$_3$)Cl raceme, ethylene-bis(indenyl)ZrH$_2$ raceme, and alumoxane compound B is selected from the group consisting of (ethyl)$_2$Al-O-Al(ethyl)$_2$, (isobutyl)$_2$Al-O-Al(isobutyl)$_2$, and (2-methylpentyl)$_2$Al-O-Al(2-methylpentyl)$_2$.

7. The catalyst of claim 6, in which M is Zr.

8. The catalyst of claim 1, in which components A) and B) are precontacted in the presence of a hydrocarbon solvent before the polymerization reaction.

9. The catalyst of claim 2, in which components A) and B) are precontacted in the presence of a hydrocarbon solvent before the polymerization reaction.

10. The catalyst of claim 3, in which components A) and B) are precontacted in the presence of a hydrocarbon solvent before the polymerization reaction.

11. The catalyst of claim 4, in which components A) and B) are precontacted in the presence of a hydrocarbon solvent before the polymerization reaction.

12. The catalyst of claim 5, in which components A) and B) are precontacted in the presence of a hydrocarbon solvent before the polymerization reaction.

13. The catalyst of claim 6, in which components A) and B) are precontacted in the presence of a hydrocarbon solvent before the polymerization reaction.

* * * * *

UNITED STATES PATENT AND TRADEMARK OFFICE
CERTIFICATE OF CORRECTION

PATENT NO. : 5,126,303

DATED : June 30, 1992

INVENTOR(S) : Luigi Resconi, Umberto Giannini, and Enrico Albizzati

It is certified that error appears in the above-identified patent and that said Letters Patent is hereby corrected as shown below:

Title Page:
  Item [73] under Assignee, change "Hinmont" to --Himont--.

Col. 5, l. 31, after "10 moles/l" insert --solvent--.

Col. 6, l. 35, change "ingredient" to --ingredients--.

Signed and Sealed this

Twenty-first Day of December, 1993

Attest:

BRUCE LEHMAN

Attesting Officer

Commissioner of Patents and Trademarks